United States Patent
Kang

(10) Patent No.: US 10,293,441 B2
(45) Date of Patent: May 21, 2019

(54) APPARATUS AND METHOD FOR ALIGNING OPTICAL AXES OF LENSES AND ASSEMBLING CAMERA MODULE

(71) Applicant: Isolution Co., Ltd., Seongnam-si, Gyeonggi-do (KR)

(72) Inventor: Sung Kwan Kang, Yongin-si (KR)

(73) Assignee: ISOLUTION CO., LTD., Seongnam-si, Gyeonggi-do (KR)

(*) Notice: Subject to any disclaimer, the term of this patent is extended or adjusted under 35 U.S.C. 154(b) by 238 days.

(21) Appl. No.: 14/560,331

(22) Filed: Dec. 4, 2014

(65) Prior Publication Data

US 2015/0174715 A1   Jun. 25, 2015

(30) Foreign Application Priority Data

Dec. 19, 2013 (KR) .......... 10-2013-0159153
Jun. 9, 2014 (KR) .......... 10-2014-0069736
Jun. 11, 2014 (KR) .......... 10-2014-0070555

(51) Int. Cl.
  *B32B 41/00*   (2006.01)
  *B23P 19/10*   (2006.01)
  (Continued)

(52) U.S. Cl.
  CPC .......... *B23P 19/105* (2013.01); *B23P 19/04* (2013.01); *B23P 21/00* (2013.01); *G03B 43/00* (2013.01);
  (Continued)

(58) Field of Classification Search
  CPC ......... B23P 19/105; B23P 21/00; B23P 19/04; G03B 43/00; Y10T 29/49769; Y10T 29/4978; Y10T 29/53022; Y10T 29/53061
  (Continued)

(56) References Cited

U.S. PATENT DOCUMENTS

2005/0007482 A1   1/2005   Liao et al.
2008/0247634 A1*  10/2008  Huang ............... H04N 5/2257
                                                    382/149
(Continued)

FOREIGN PATENT DOCUMENTS

JP   2001-218102 A   8/2001
JP   2008-124796 A   5/2008
(Continued)

OTHER PUBLICATIONS

European Office Action dated Sep. 28, 2018, in connection with the European Patent Application No. 14871629.3.
(Continued)

*Primary Examiner* — Michael N Orlando
*Assistant Examiner* — Joshel Rivera
(74) *Attorney, Agent, or Firm* — Hauptman Ham, LLP

(57) ABSTRACT

Provided are an apparatus and method of aligning optical axes of lenses and assembling a camera module that are capable of adjusting the optical axes of the lenses. The apparatus for aligning the optical axes of the lenses and assembling the camera module includes a support block to support a substrate at which an image sensor is installed, a displacement sensor to measure a tilted state of the image sensor, a fastener to fasten or loosen fastening components to couple a lens holder to the substrate, and a controller to control a fastening level of the lens holder by the fastener to correct a tilted state according to a measurement result of the displacement sensor. The optical axis of the lens can be rapidly and precisely adjusted and assembled by use of the above described apparatus and method.

6 Claims, 18 Drawing Sheets

(51) Int. Cl.
   *B23P 19/04*     (2006.01)
   *B23P 21/00*     (2006.01)
   *G03B 43/00*     (2006.01)
(52) U.S. Cl.
   CPC ...... *Y10T 29/4978* (2015.01); *Y10T 29/49769* (2015.01); *Y10T 29/53022* (2015.01); *Y10T 29/53061* (2015.01)
(58) Field of Classification Search
   USPC .................. 156/60, 64, 350, 351, 378, 379
   See application file for complete search history.

(56) References Cited

U.S. PATENT DOCUMENTS

| 2008/0307626 | A1* | 12/2008 | Chen ...................... G02B 7/022 29/407.1 |
| 2012/0113318 | A1* | 5/2012 | Galstian ........... B29D 11/00298 348/374 |
| 2013/0047396 | A1* | 2/2013 | Au ........................ B23Q 17/22 29/407.09 |

FOREIGN PATENT DOCUMENTS

| KR | 10-2008-0108661 | 12/2008 |
| KR | 10-2010-0013908 | 2/2010 |
| KR | 10-2010-0106010 | 10/2010 |
| KR | 10-2010-0106015 | 10/2010 |
| KR | 10-2010-0130833 | 12/2010 |
| KR | 10-2013-0058396 | 6/2013 |
| KR | 10-2013-0061432 | 6/2013 |
| KR | 10-2013-0063648 | 6/2013 |

OTHER PUBLICATIONS

Japanese Office Action dated Mar. 5, 2019, in connection with the counterpart Japanese Patent Application No. 2016-541178.

* cited by examiner

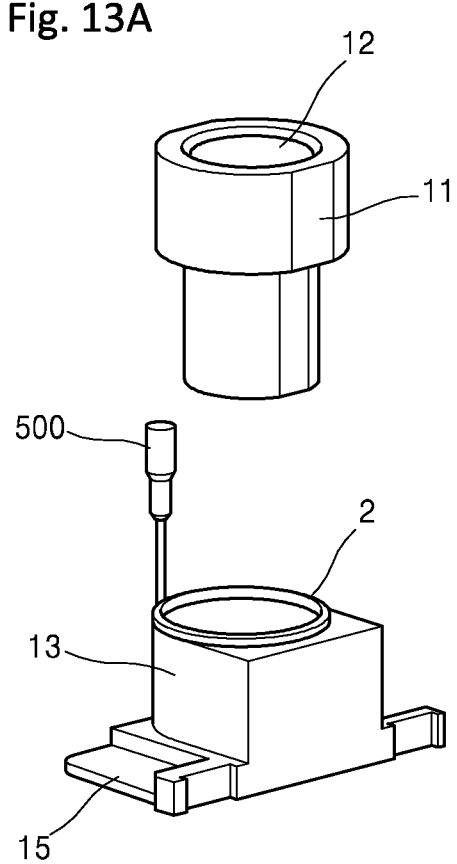

APPARATUS AND METHOD FOR ALIGNING OPTICAL AXES OF LENSES AND ASSEMBLING CAMERA MODULE

BACKGROUND

1. Field of the Invention

The present invention relates to an apparatus and method of assembling a camera module for monitoring front and rear sides or automatic driving of a vehicle, and more particularly, to an apparatus and method of aligning optical axes of lenses installed in a camera module and assembling the camera module.

2. Discussion of Related Art

In recent automobile technologies, cameras are mounted in a vehicle to guide parking or monitor surroundings of the vehicle. Demand of mounting cameras in a vehicle increases for the purposes of, for example, monitoring performance of automatic driving function such as lane maintaining, road sign recognition, or the like.

In general, a camera mounted in a vehicle is supplied as a module type in which various parts such as an image sensor, a lens, and so on, are integrally assembled. In case that optical axes of the lens or the image sensor cannot be precisely aligned, the camera cannot properly perform the intended functions such as monitoring performances of a vehicle.

Accordingly, in order to implement proper performance of a camera module, especially a high performance camera module, with high reliability, the optical axes of the lenses should be precisely adjusted upon assembly of the camera module. Thus, needed are an apparatus and method of assembling a camera module with capability of precise adjustment and alignment of optical axes of the lenses.

SUMMARY OF THE INVENTION

The present invention is directed to an apparatus and method of aligning optical axes of lenses and assembling a camera module, which are improved to efficiently assemble the camera module while precisely adjusting the optical axes of the lenses.

According to an aspect of the present invention, an apparatus for aligning optical axes of lenses and assembling a camera module includes a support block configured to support a substrate on which an image sensor is installed; a displacement sensor configured to detect a tilted state of the image sensor to generate sensor tilt information; a lens holder coupled with the substrate by means of fastening components; a fastener driven to tighten or loosen the fastening components; and a controller configured to control the fastener. The controller is controlled according to the sensor tilt information to control the fastener to fasten or loosen the fastening components with different fastening levels while controlling an axis of the support block in order to correct the tilted state of the image sensor.

According to other aspect of the present invention, a method of aligning optical axes of lenses and assembling a camera module includes a support block setting step of setting a substrate, at which an image sensor is installed and to which a lens holder is fastened, to a support block, wherein an active region of the image sensor is exposed through a holder hole the lens holder; a sensor tilting correction step of measuring a plurality of points of the active region of the image sensor exposed through the holder hole using a displacement sensor to generate sensor tilt information in order to correct tilting of the image sensor, wherein a controller controls the support block according to the sensor tilt information; a lens barrel insertion step of inserting a lens barrel at which the lens is installed into the lens holder to which an adhesive agent is applied, after the tilting correction step is performed; and a lens barrel control step of aligning a center of the lens to a reference point of the image sensor after the lens barrel insertion step is performed, wherein the controller controls the lens barrel according to a lens image, and the lens image is an image of the test chart detected by the image sensor through the lens.

According to another aspect of the present invention, a method of aligning optical axes of lenses and assembling a camera module includes a module heating step of heating the camera module, wherein the camera module comprises a substrate at which an image sensor is installed, a lens barrel at which a lens is installed, and a lens holder coupled between the substrate and the lens barrel; applying an adhesive agent between the lens barrel and the lens holder; a support block setting step of setting the heated camera module to a support block; a barrel tilting correction step of measuring a plurality of points on an end section of the lens barrel of the heated camera module using a displacement sensor to generate barrel tilting information, wherein a controller controls the support block according to the barrel tilting information; and a determination step of causing the controller to determine whether the optical axis of the camera module is good or bad through a determination image after the barrel tilting correction step is performed, wherein the determination image is an image of a test chart detected by the image sensor.

According to another aspect of the present invention, a camera module manufactured by the method according to the method is provided.

In the apparatus and method of aligning the optical axes of the lenses and assembling the camera module having the above-mentioned configuration, the lenses can be assembled while rapidly and precisely adjusting the optical axes so that the high performance camera module can be efficiently implemented.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 13A to 13D are views for describing a process of installing a lens barrel to a lens holder.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, embodiments of the present invention will be described in detail with reference to the accompanying drawings. However, specific structural and functional details disclosed herein are merely representative for purposes of describing exemplary embodiments of the present invention. It will be understood that when an element is referred to as being on another element, it can be directly on the other element or intervening elements may be present therebetween. In contrast, when an element is referred to as being "directly on" another element, there are no intervening elements present. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
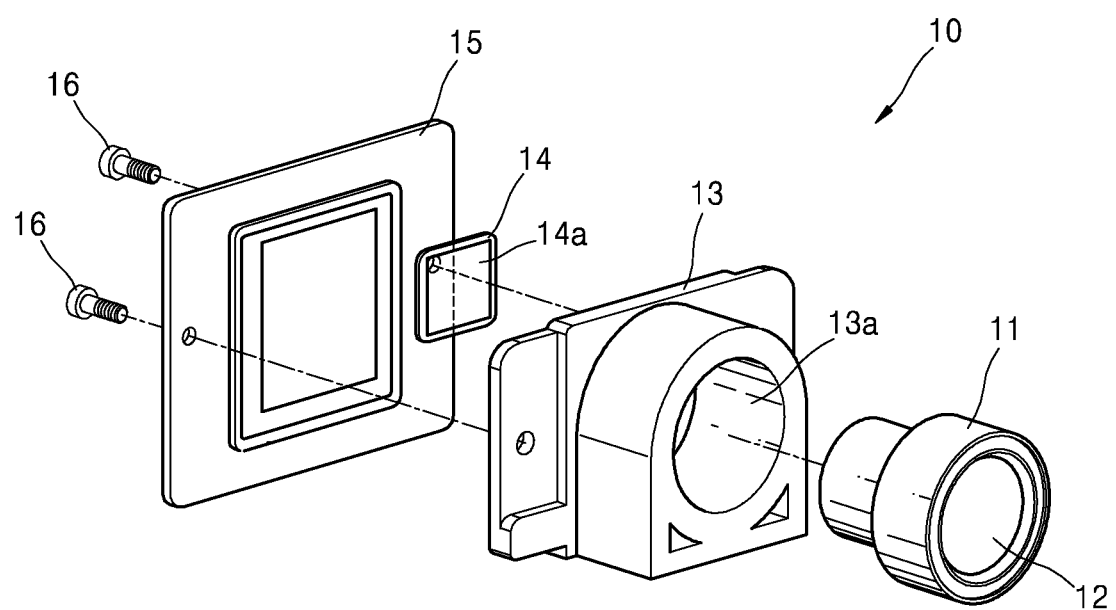
FIG. 1 is an exploded perspective view showing a structure of a camera module adjusted by an apparatus for aligning optical axes of lenses and assembling a camera module according to the present invention.

The present invention relates to an apparatus for aligning optical axes of lenses and assembling a camera module to assemble a camera module 10 as shown in FIG. 1, and a method of aligning optical axes of lenses using the same.

The camera module 10 includes a substrate 15 to which an image sensor 14 is attached, a lens holder 13, and a lens barrel 11.

For example, the substrate 15 is wired to transmit signals, data, information, and so on. The lens holder 13 is coupled with the substrate 15. The lens barrel 11 on which a lens 12 is mounted is coupled to the lens holder 13.

The lens can be focused on a precise position of the image sensor 14 when the optical axes of the assembled camera module 10 are aligned well. In contrast, the lens may be focused on an incorrect position when an error occurs in the alignment of the optical axes.

The causes of generating the error in the optical axis alignment may include the followings but not limited to.

A first cause is "image sensor attachment tilting" which can be generated when the image sensor 14 is attached to the substrate 15 via a conductive adhesive agent.

A second cause is "'lens barrel coupling tilting" which can be generated when the lens barrel 11 is coupled to the lens holder 13 fastened to the substrate 15 at which the image sensor 14 is installed.

A third cause is "'adhesive agent curing tilting" which can be generated when the adhesive agent between the lens holder 13 and the lens barrel 11 is cured through heating.

Exemplary embodiments of the apparatus for aligning the optical axes of the lenses and assembling the camera module will be described with reference to the relevant drawings.

Figure 2A:
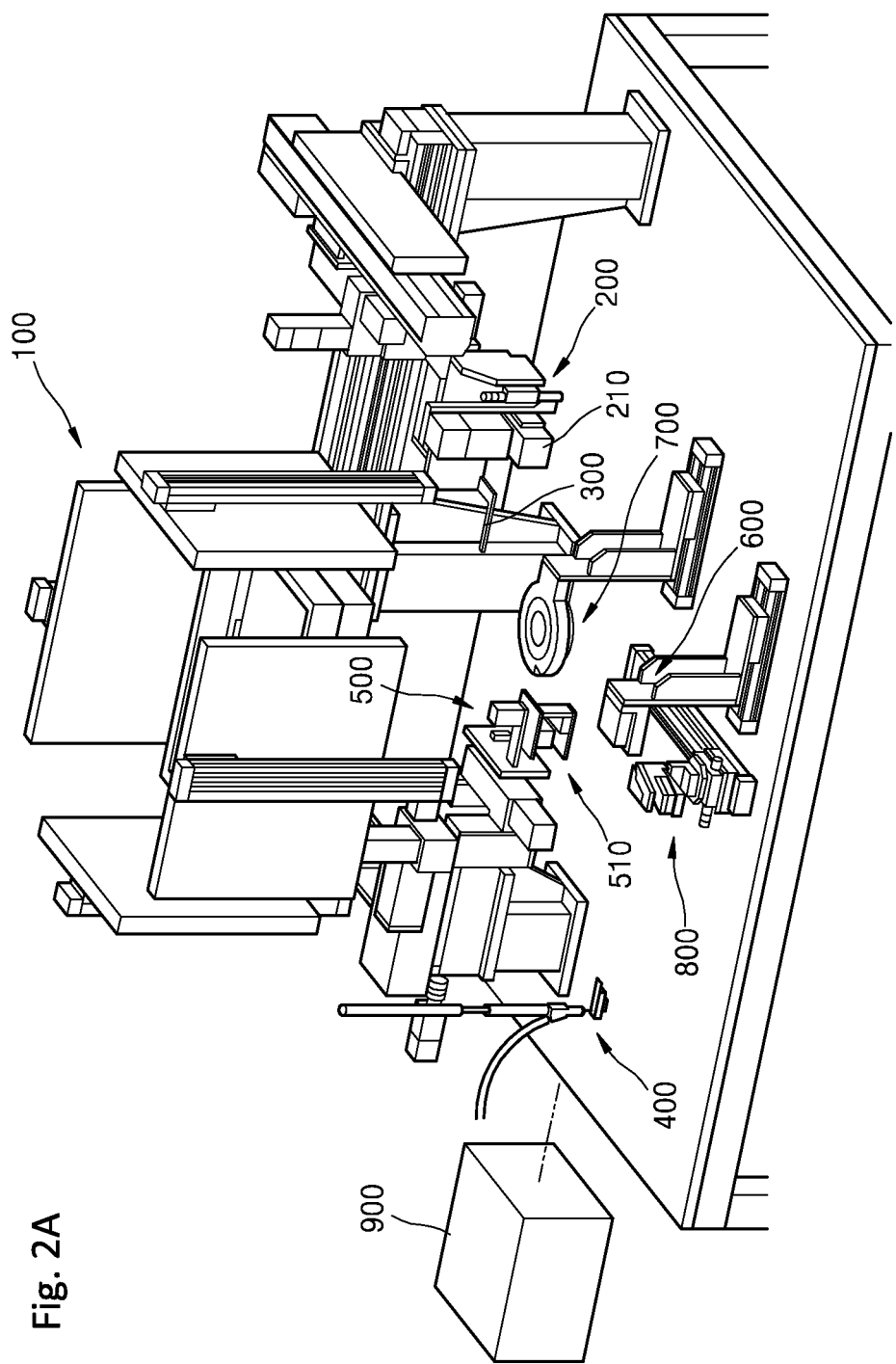
FIGS. 2A And 2B are views showing the apparatus for aligning the optical axes of the lenses and assembling the camera module of the present invention.
Figure 2B:
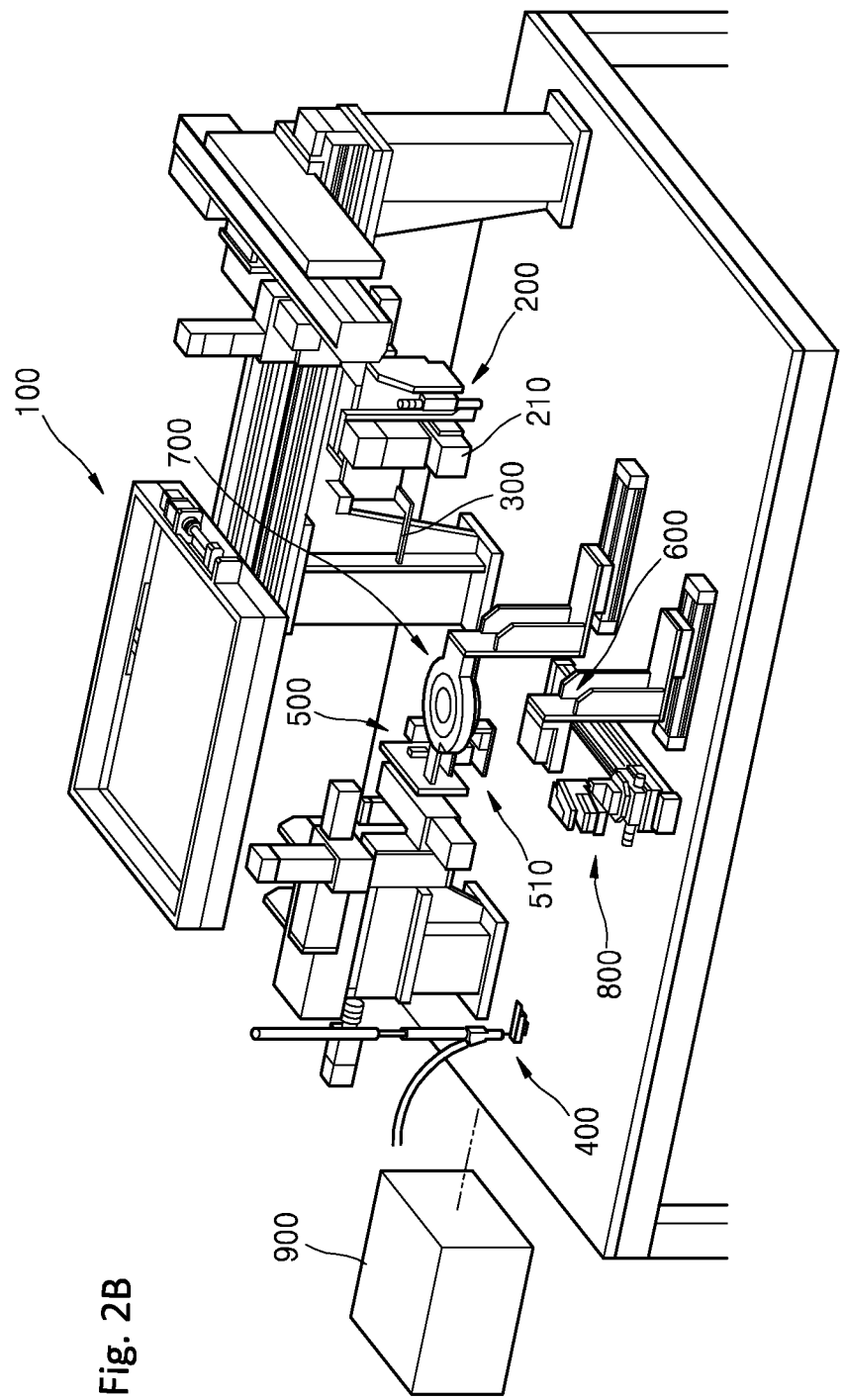

FIGS. 2A and 2B show exemplary embodiments of configuration of the apparatus for aligning the optical axes of the lens. Here, FIG. 2A shows one exemplary embodiment where a fisheye lens is mounted on the camera module 10, and FIG. 2B shows another exemplary embodiment where a normal lens is mounted.

Reference numeral 100 designates a test chart system test-photographed by the image sensor 14. A test chart having a test pattern detected by the image sensor 14 is installed at the test chart system 100.

Reference numeral 200 designates a displacement sensor configured to detect a tilted state of a subject to generate various tilt information. The displacement sensor 200 can detect a tilted state of the camera module 10, the image sensor 14, an end section of the lens barrel 11, or the like, to generate tilt information. For example, the displacement sensor 200 can be implemented with a non-contact sensor or a confocal displacement sensor configured to precisely measure displacement of the subject using a wavelength range of light. In other instances, the displacement sensor 200 may be implemented with a two-dimensional or three-dimensional displacement sensor configured to measure the displacement while moving along the entire line or surface at a predetermined speed.

Reference numeral 300 designates a lens clamper configured to clamp the lens barrel 11 (see FIG. 1) inserted and coupled into the lens holder 13 and adjust the position while moving the lens barrel 11 on a coupling surface of the lens holder 13 by a fine gap. Reference numeral 210 designates a vision camera configured to a horizontal shift level of the image sensor 14.

Reference numeral 400 designates a fastener which is driven to tighten or loosen fastening components by means of which the lens holder 13 is coupled with the substrate 15.

In this embodiment, for example, a bolt fastener 400 is employed to tighten or loosen bolts which are employed as the fastening components.

Reference numeral 500 designates a dispenser configured to apply an adhesive agent to one surface of the lens holder 13 to couple the lens barrel 11 to the lens holder 13. Reference numeral 510 designates an UV radiator configured to radiate an ultraviolet ray to the adhesive agent to cure the adhesive agent.

Reference numeral 600 designates an LED illuminator configured to illuminate the camera module 10 mounted on a support block 800 to easily check contaminations or cracks of the lens 12 with naked eyes. In addition, a test of shading and an optical axis can be observed with naked eyes by use of the LED illuminator 600.

Reference numeral 700 designates a collimator lens configured to reduce a focal distance of the lens 12 to be focused to a pattern of a test chart system installed near the camera module 10.

An assembled object is mounted on the support block 800. Tilting of the support block 800 can be adjusted.

Reference numeral 900 designates a controller configured to control the entire components.

A method of aligning optical axes of lenses and assembling a camera module to correct three kinds of tilting that causes deviation of the optical axes using the apparatus for aligning the optical axes of the lenses and assembling the camera module of the present invention will be sequentially described.

Image Sensor Attachment Tilting Correction

When the image sensor attachment tilting is generated, the optical axis with reference to a center of the image sensor 14 is tilted, so that a center of the lens 12 is deviated from the center of the image sensor 14 when the lens holder 13 and the lens barrel 11 are installed with reference to a vertical line of the center.

An exemplary embodiment of the apparatus for aligning the optical axes of the lenses and assembling the camera module to correct the image sensor attachment tilting will be described below with reference to the relevant drawings.

The support block 800 supports the substrate 15 to which the image sensor 14 is attached. The displacement sensor 200 detects the tilted state of the image sensor 14 to generate sensor tilt information. The lens holder 13 is coupled with the substrate 15 by means of fastening components. In this embodiment, for example, the lens holder 13 is fastened to the substrate 15 by at least two bolts 16. The bolt fastener 400 is driven to fasten the at least two bolts 16 to fasten the lens holder 13 to the substrate 15. The controller 900 controls the bolt fastener 400. Thereby, the support block 800 can adjust the tilting.

In other words, the substrate 15 to which the image sensor 14 is attached is placed on the support block 800. The tilted state of the image sensor 14 is detected to generate the sensor tilt information by the displacement sensor 200. The controller 900 performs in accordance with the sensor tilt information to correct the tilted state of the image sensor 14, and controls the bolt fastener 400. The controller 900 may also perform controlling an axis of the support block 800 as well as the controlling of the bolt fastener 400. Thus, the lens holder 13 is fastened to or loosened from the substrate 15 accordingly.

A process of aligning the optical axes using the apparatus for aligning the optical axes of the lenses and assembling the camera module of the present invention is described below.

The substrate 15 to which the image sensor 14 is attached is mounted on the support block 800. The substrate 15 may be mounted in an automatic or manual manner. Here, a center of the image sensor 14 of the substrate 15 may be slightly tilted, and the tilted state is measured by the displacement sensor 200.

Figure 3:
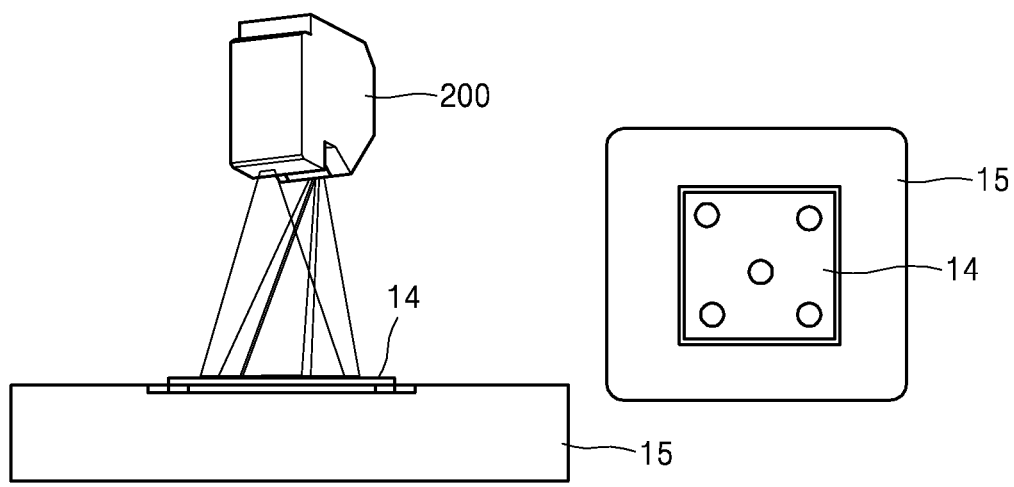
FIG. 3 is a view showing a process of measuring a tilted state of an image sensor using a displacement sensor of the apparatus for aligning the optical axes of the lenses and assembling the camera module of the present invention.

As shown in FIG. 3, the displacement sensor 200 moves above the support block 800 to measure flatness characteristics of multiple points (for example, five or more) of the image sensor 14, and the controller 900 recognizes the tilted state of the image sensor 14 from the measurement information.

When the tilted state of the image sensor 14 is recognized, a process of fastening/loosening the lens holder 13 is performed in consideration of the tilted state. The controller 900 controls the bolt fastener 400 to appropriately fasten or loosen the bolts 16. The controller 900 may control the bolt fastener 400 while adjusting the tilting through control of the axis of the support block 800 according to the sensor tilt information.

Figure 4:
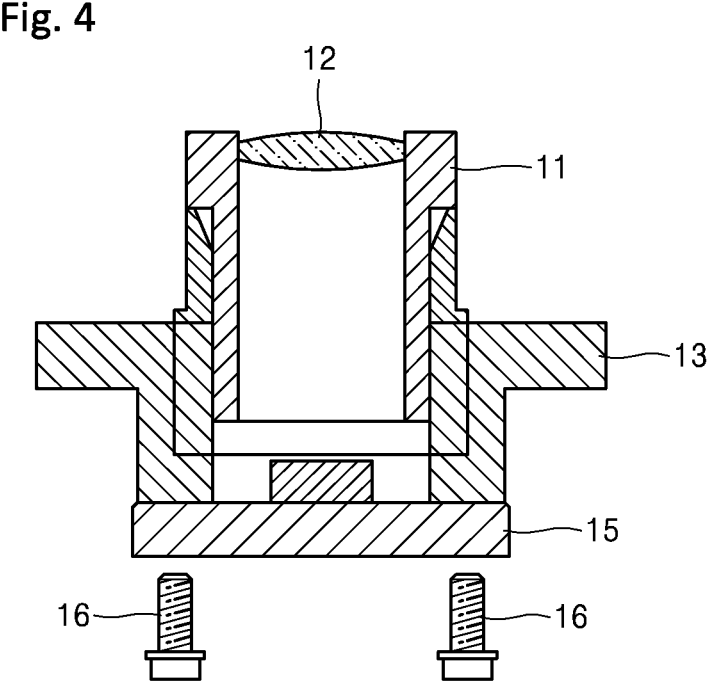
FIG. 4 is a cross-sectional view of the camera module shown in FIG. 1.

As shown in FIG. 4, the bolts 16 are disposed at least two places, and fastening levels of the bolts 16 are varied to correct the tilted state of the image sensor 14. In other words, when the fastening levels of the bolts 16 are varied, gaps between the lens holder 13 and the substrate 15 may be different at different areas such as a relatively more strongly fastened area and a relatively less strongly fastened area. As a result, the tilted state of the optical axis can be corrected when the fastening level is adjusted by reflecting the tilted state of the image sensor 14 measured by the displacement sensor 200.

The above description was made with reference to cross section illustration of FIG. 4, which is a schematic illustration of an idealized embodiment of the present invention. As such, variations from the shapes of the illustration as a result, for example, of manufacturing techniques and/or tolerances, are to be expected. Thus, any embodiment of the present invention should not be construed as limited to the particular shapes illustrated herein but is to include deviations in shapes.

Lens Barrel Coupling Tilting Correction Compensation

Correcting the lens barrel coupling tilting by means of the apparatus for aligning the optical axes of the lenses and assembling the camera module of the present invention will be described below.

Here, the support block 800 can adjust tilting, rotation and shift. The lens holder 13 is fastened to the substrate 15 such that an active region 14a of the image sensor 14 is exposed through a holder hole 13a.

Figure 5:
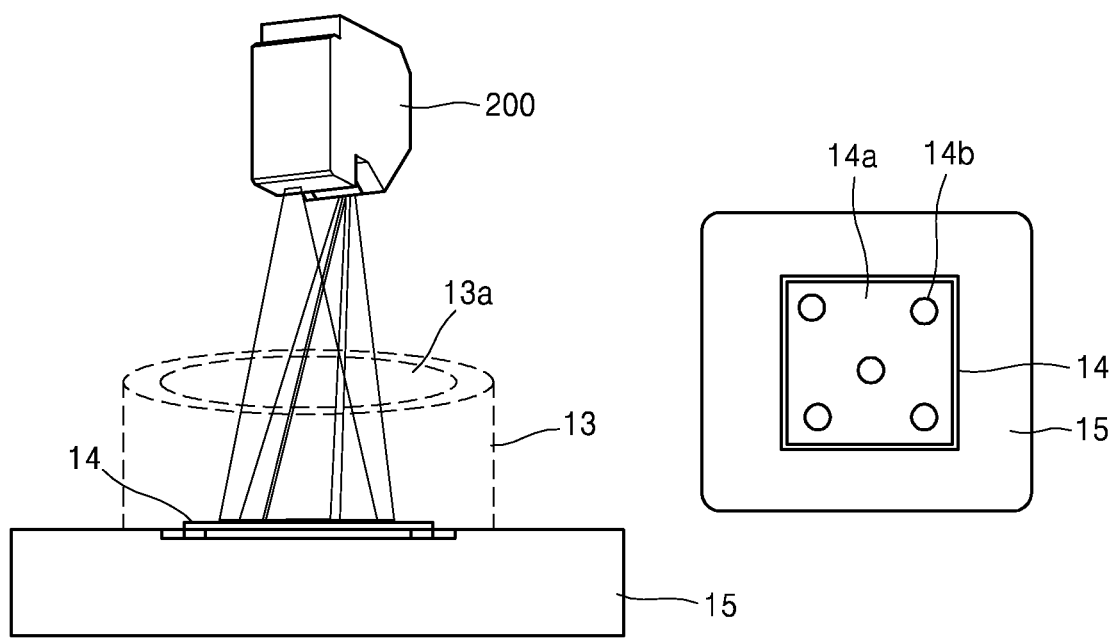
FIG. 5 is a view for describing a process of lens barrel tilting correction by means of the apparatus for aligning the optical axes of the lenses and assembling the camera module of the present invention.

As shown in FIG. 5, the displacement sensor 200 detects the tilted state of the image sensor 14 installed at the substrate 15 to generate the sensor tilt information.

The displacement sensor 200 measures displacement of a plurality of points 14b on the active region 14a actually imaged by the image sensor 14 to detect the tilted state of the image sensor 14.

The controller 900 is driven to control the support block 800, and ultimately tilt the image sensor 14 according to the sensor tilt information to correct the tilted state of the image sensor 14.

Figure 6:
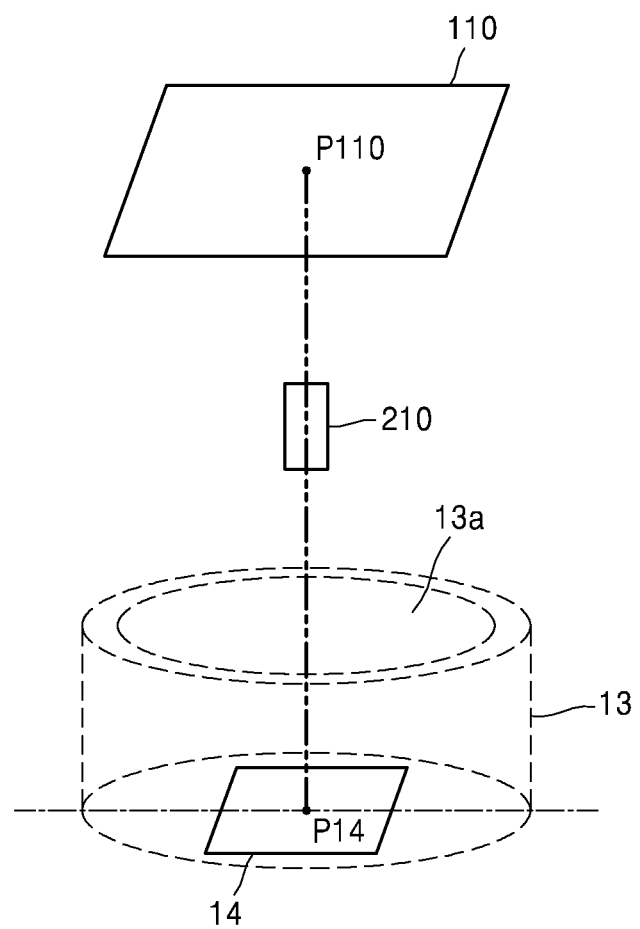
FIG. 6 is a view for describing a process of measuring and matching a reference point of an image sensor and a reference point of a test chart using a vision camera for the lens barrel tilting correction.

As shown in FIG. 6, the vision camera 210 checks a vision image through the holder hole 13a of the lens holder 13. Here, the vision image is an image of the image sensor 14.

In this case, the controller 900 is driven to shift the support block 800 (ultimately, the image sensor 14) or a test chart 110 according to the vision image checked by the vision camera 210 to match a reference point P14 of the image sensor 14 and a reference point P110 of the test chart 110.

The reference point P14 of the image sensor 14 is a center point of the image sensor 14, and the reference point P110 of the test chart 110 is a center point of the test chart 110.

The lens clamper 300 clamps and moves the lens barrel 11 at which the lens 12 is installed. The lens clamper 300 may be controlled by the controller 900.

Figure 7:
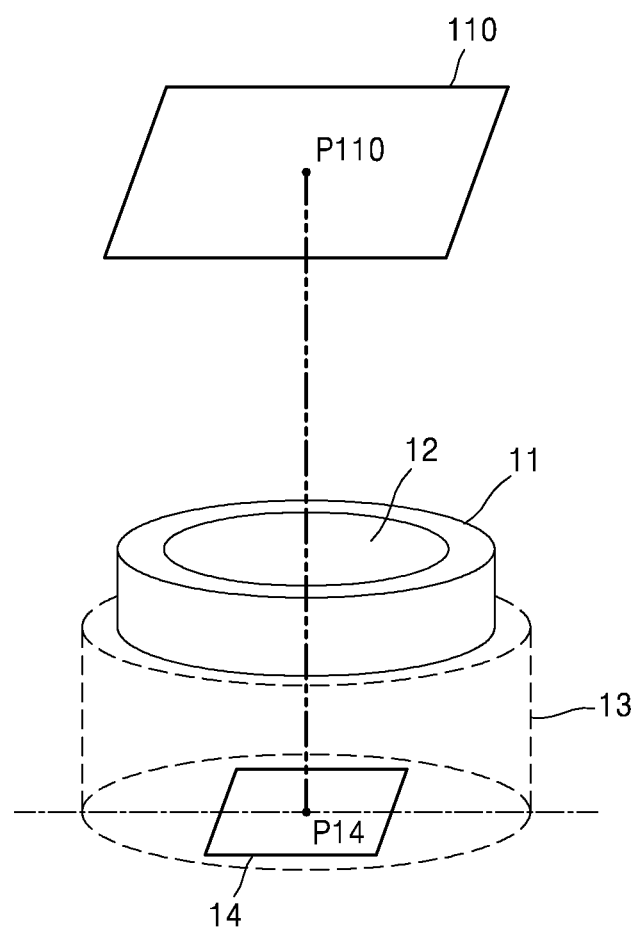
FIG. 7 is a view for describing a process of matching a center point of the lens and the reference point of the image sensor installed at a lens barrel for the lens barrel tilting correction.

As shown in FIG. 7, in a state that the lens barrel 11 is fastened to the lens holder 13, a lens image serving as an image of the test chart 110 is detected by the image sensor 14 through the lens 12.

In this case, the controller 900 is driven to control the lens barrel 11 in accordance with the lens image to match a center point of the lens 12 with the reference point P14 of the image sensor 14.

Figure 8:
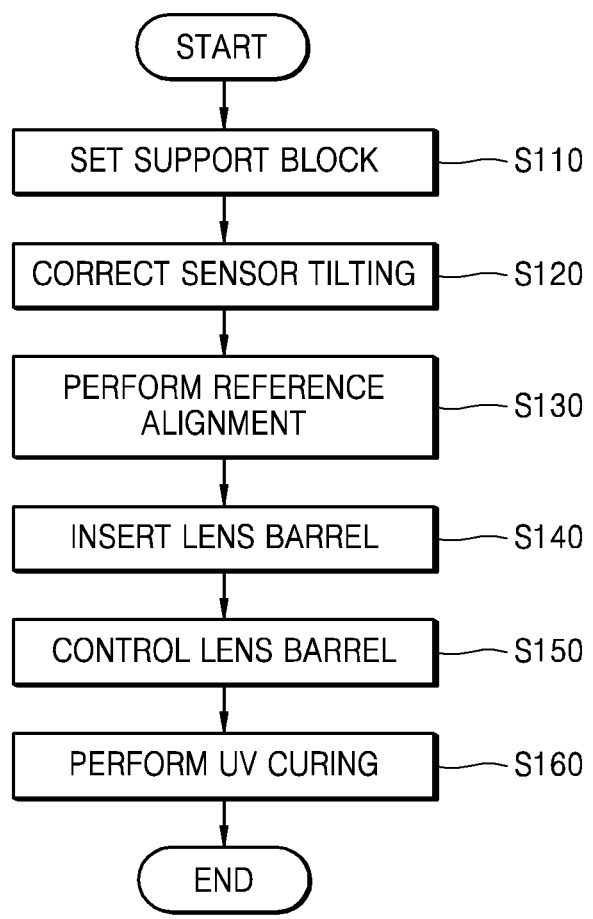
FIG. 8 is a flowchart showing a method of aligning optical axes of lenses and assembling a module of the present invention to perform the lens barrel tilting correction.

FIG. 8 is a flowchart showing the method of aligning the optical axes of the lenses and assembling the camera module according to an embodiment of the present invention, especially, to correct the lens barrel coupling tilting.

Referring to FIG. 8, the method of aligning the optical axes of the lenses and assembling the camera module of the present invention to correct the lens barrel coupling tilting includes a support block setting step (S110), a tilting correction step (S120), a reference alignment step (S130), a lens barrel insertion step (S140), and a lens barrel control step (S150).

In the support block setting step (S110), the image sensor 14 is installed, and the substrate 15 to which the lens holder 13 is fastened is set to the support block 800. The lens holder 13 is fastened to the substrate 15 such the active region 14a of the image sensor 14 is exposed through the holder hole 13a. (referring to FIG. 5)

In the sensor tilting correction step (S120), the plurality of points 14b of the active region 14a of the image sensor 14 are measured by the displacement sensor 200 to generate the sensor tilt information. In order to correct the tilting of the image sensor 14, the controller 900 is driven to control the support block 800 according to the sensor tilt information.

In the reference alignment step S130, in order to match the reference point P110 of the test chart 110 and the reference point P14 of the image sensor 14, the controller 900 is controlled to shift the support block 800 or the test chart 110 according to the vision image. As mentioned above, the vision image is an image of the image sensor 14 checked by the vision camera 210.

The reference point P14 of the image sensor 14 may be the center point of the image sensor 14, and the reference point P110 of the test chart 110 may be the center point of the test chart 110.

In the lens barrel insertion step (S140), the lens barrel 11 at which the lens 12 is installed is inserted into the lens holder 13 to which the adhesive agent is applied.

In the lens barrel control step (S150) which is, for example, performed after the reference alignment step (S130) and the lens barrel insertion step (S140), in order to align the center of the lens 12 to the reference point P14 of the image sensor 14, the controller 900 is driven to control the lens barrel 11 according to the lens image. As mentioned above, the lens image is an image of the test chart 110 detected by the image sensor 14 through the lens 12.

In the UV curing step (S160), after the center of the lens 12 is aligned to the reference point P14 of the image sensor 14, the adhesive agent is irradiated with an ultraviolet ray to be temporarily cured.

When the camera module 10 is assembled through the above-mentioned process, the lens barrel coupling tilting is compensated, and the optical axis between the lens 12 and the image sensor 14 can be rapidly and accurately aligned.

Adhesive Agent Curing Tilting Correction

The adhesive agent curing tilting can be caused when the adhesive agent between the lens holder 13 and the lens barrel 11 is cured through heating to couple the lens barrel 11 to the lens holder 13. Due to non-uniformity of a thickness of the cured adhesive agent, the optical axis of the lens 12 may be deviated.

The apparatus and method for aligning the optical axes of the lenses and assembling the camera module to correct the adhesive agent curing tilting will be described below with reference to the relevant drawings.

The camera module 10 is mounted onto the support block 800. The camera module 10 includes the substrate 15 at which the image sensor 14 is installed, the lens barrel 11 at which the lens 12 is installed, and the lens holder 13 coupled between the substrate 15 and the lens barrel 11.

The lens holder 13 is fastened to the substrate 15 such that the active region 14a of the image sensor 14 is exposed through the holder hole 13a.

The lens barrel 11 is coupled to the lens holder 13 through the adhesive agent cured, for example, through heating.

Figure 9:
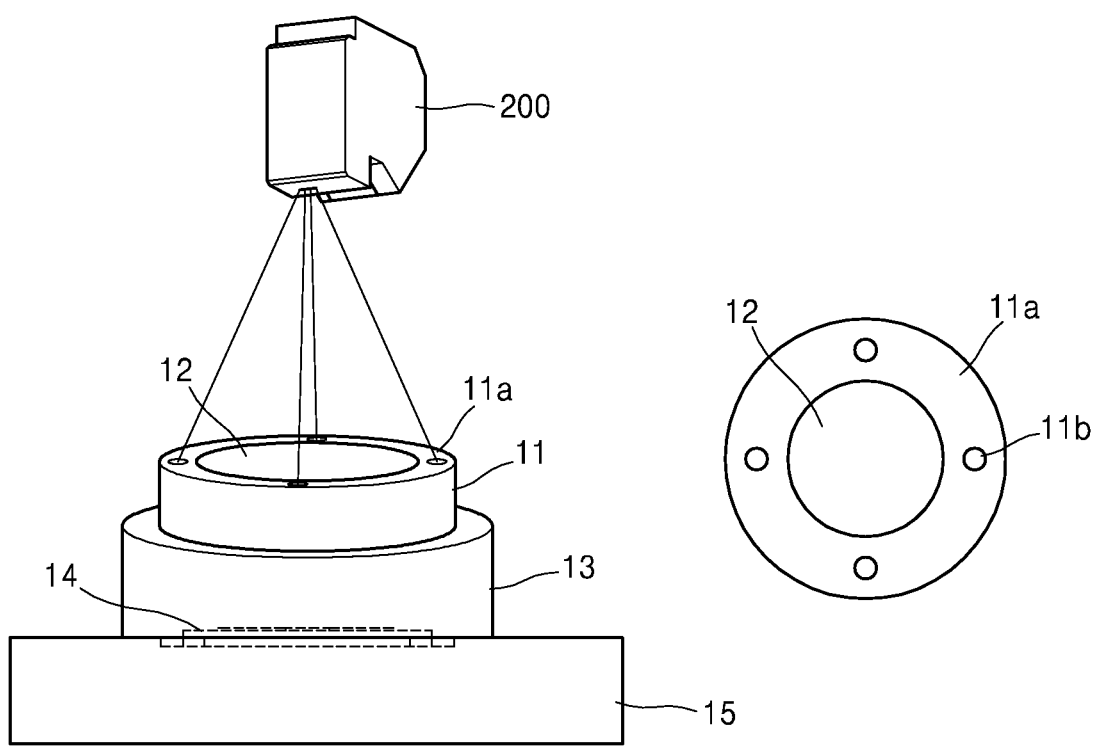
FIG. 9 is a view for describing a process of adhesive agent curing tilting correction by means of the apparatus for aligning the optical axes of the lenses and assembling the camera module of the present invention.

As shown in FIG. 9, the displacement sensor 200 detects the tilted state of the lens barrel 11 to generate a barrel tilting information after the adhesive agent is cured or heated.

The displacement sensor 200 measures displacement of a plurality of points 11b on a surface of a predetermined section 11a of the lens barrel 11 near the displacement sensor 200 to detect the tilted state of the lens barrel 11.

The controller 900 is driven to control the support block 800 according to the barrel tilting information to tilt the lens barrel 11 so as to correct the tilted state of the lens barrel 11.

Figure 10:
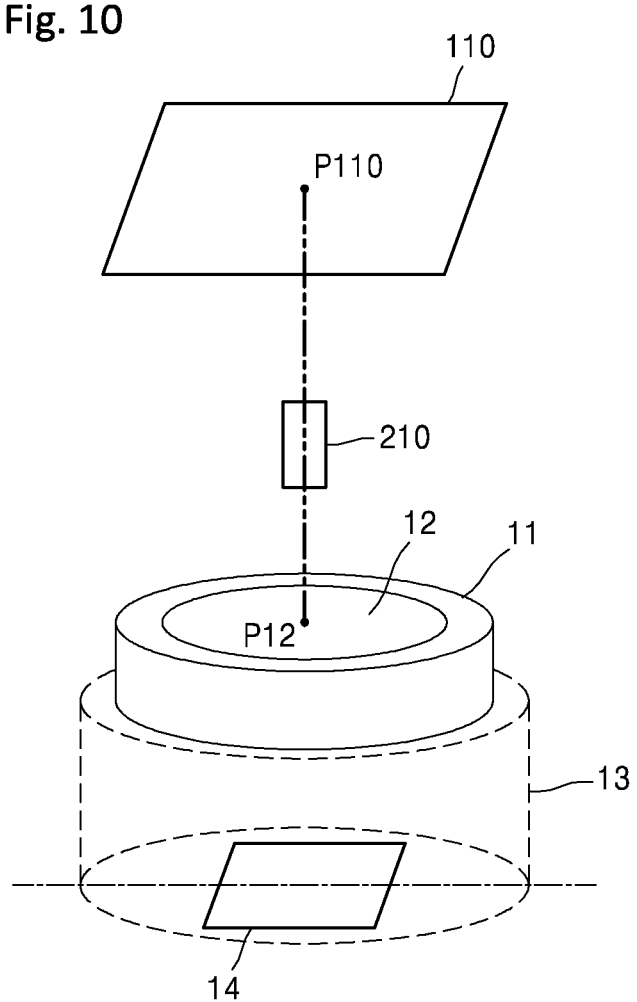
FIG. 10 is a view for describing a process of matching a center point of the lens and a reference point of a test chart for the adhesive agent curing tilting correction.

As shown in FIG. 10, the vision camera 210 checks the heating vision image through the lens 12 after the adhesive agent is cured or heated. Here, the heating vision image is an image of the lens 12 after the adhesive agent is heated or cured.

In this case, the controller 900 is driven to shift the support block 800 (ultimately, the lens 12) or the test chart 110 according to the heating vision image checked by the vision camera 210, so as to match a reference point P12 of the lens and the reference point P110 of the test chart 110.

Here, the reference point P12 of the lens 12 is the center point of the lens 12, and the reference point P110 of the test chart 110 is the center point of the test chart 110.

Figure 11:
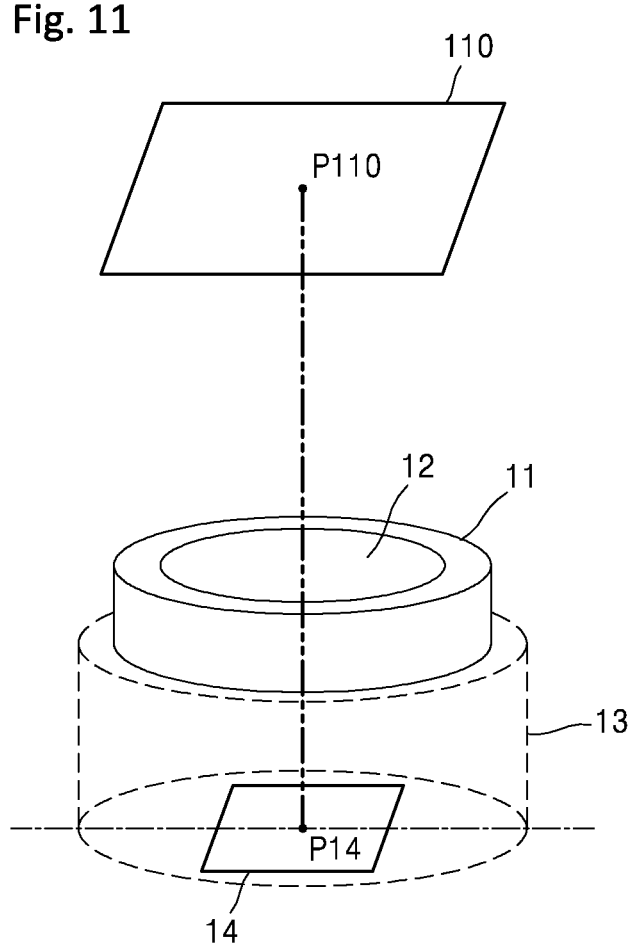
FIG. 11 is a view for describing a process of determining whether a defect of the camera module is generated by measuring a test chart using an image sensor for the adhesive agent curing tilting correction.

As shown in FIG. 11, the image sensor 14 checks a determination image through the lens 12 after the adhesive agent is heated or cured. Here, the determination image is an image of the test chart 110 detected by the image sensor 14 through the lens 12 after the adhesive agent is heated or cured.

In this case, the controller 900 determines whether the optical axis of the camera module 10 is good or bad through the determination image.

For example, whether the optical axis of the camera module 10 is good or bad may be determined by comparing the determination image with a predetermined reference image. In another example, whether the optical axis of the camera module 10 is good or bad may be determined by comparing optical axis measurement values of the determination image with predetermined optical axis reference values. Or, it may be determined through other various method.

Figure 12:
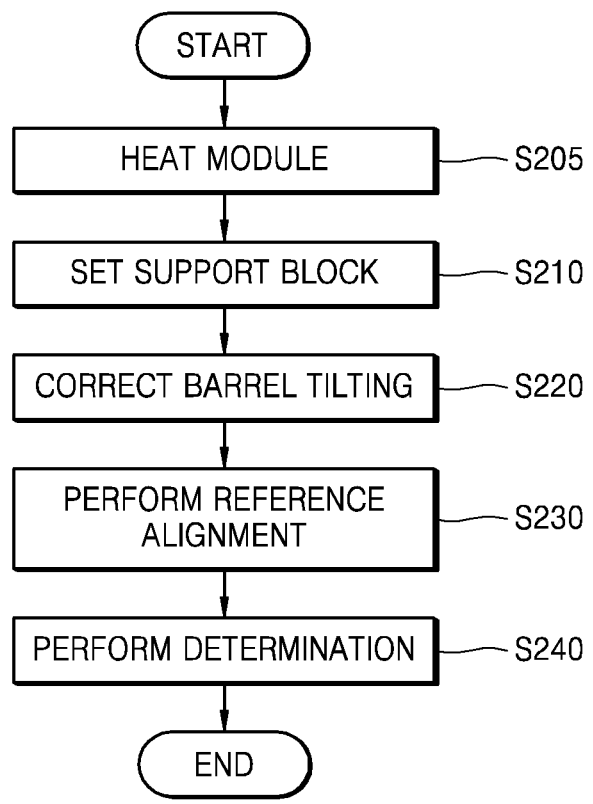
FIG. 12 is a flowchart showing a method of aligning optical axes of lenses and assembling a camera module according to an embodiment of the present invention to perform the adhesive agent curing tilting correction.

FIG. 12 is a flowchart showing the method of aligning the optical axes of the lenses and assembling the module according to an embodiment of the present invention to perform the adhesive agent curing tilting correction.

Referring to FIG. 12, in a module heating step (S205), the camera module 10 is heated. The camera module 10 includes the substrate 15 at which the image sensor 14 is installed, the lens barrel 11 at which the lens 12 is installed, and the lens holder 13 coupled between the substrate 15 and the lens barrel 11. The lens holder 13 is fastened to the substrate 15 such that the active region 14a of the image sensor 14 is exposed through the holder hole 13a, and the lens barrel 11 is coupled to the lens holder 13 through an adhesive agent 2 (referring to FIG. 13A) cured by the heating.

Figure 13B:
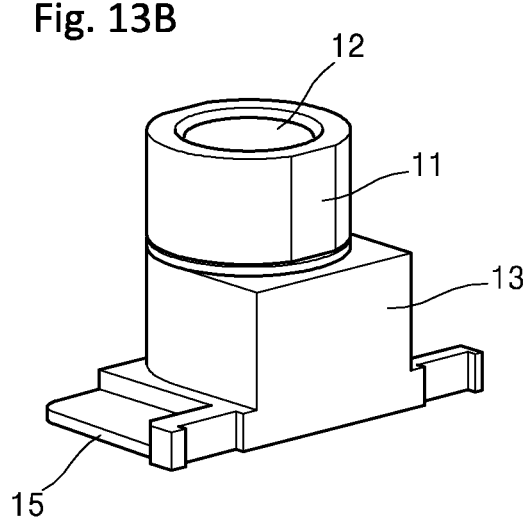

Specifically, as shown in FIG. 13A, the dispenser 500 is driven to apply the adhesive agent 2 to one surface of the lens holder 13. Then, as shown in FIG. 13B, the lens barrel 11 is inserted and coupled to an adhesion surface of the lens holder 13. The operation of inserting the lens barrel 11 into the lens holder 13 may be performed in an automatic or manual manner. The test chart system 100 is operated such that the test pattern is directly photographed by the image sensor 14 after the lens barrel 11 is inserted.

Figure 13C:
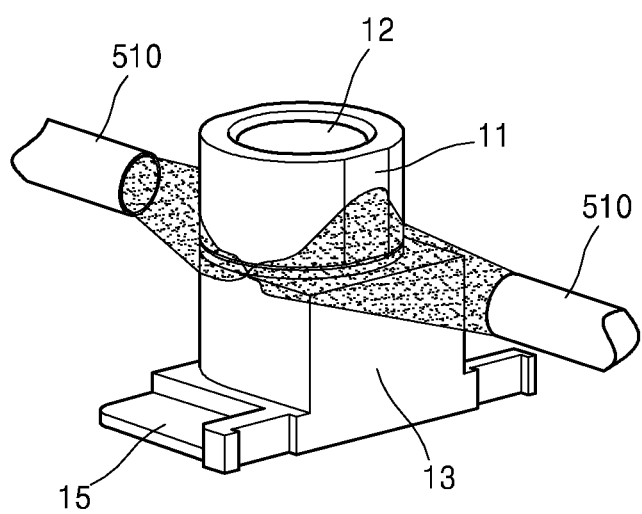

When it is determined that the optical axes are not properly aligned upon photographing the test pattern, the lens barrel 11 is clamped by the lens clamper 300 to be slightly moved on the coupling surface of the lens holder 13 to adjust a tilting error. Then, as shown in FIG. 13C, the UV radiator 510 radiates an ultraviolet ray to primarily or temporarily cure the adhesive agent 2.

After the lens barrel 11 is coupled as described above, the surface of the lens 12 is checked with naked eyes by turning on the LED illuminator 600. The LED illuminator 600 can also perform a test of the optical axis while checking the surface of the lens 12, which may have defects such as shading, defects, stains, or the like.

The test chart system 100 is operated, and the test pattern is directly photographed by the image sensor 14.

Figure 13D:
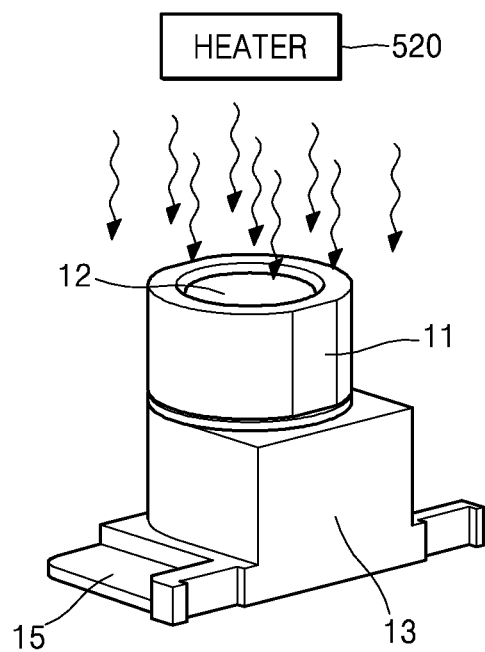

After completion of the adjustment, as shown in FIG. 13D, the camera module 10 is heated by a heater 520 to completely cure the adhesive agent 2 between the lens holder 13 and the lens barrel 11.

Referring back to FIG. 12, in a support block setting step (S210), the heated camera module 10 is set to the support block 800.

In a barrel tilting correction step (S220), the tilting of the lens barrel 11 of the heated camera module 10 is corrected. In the barrel tilting correction step (S220), the plurality of points 11b on the end section 11a of the lens barrel 11 near the displacement sensor 200 are measured by the displacement sensor 200 to generate barrel tilting information. In order to correct the tilting of the lens barrel 11, the controller 900 is driven to control the support block 800 according to the barrel tilting information.

In a reference alignment step (S230), in order to match the reference point P110 of the test chart 110 and the reference point P12 of the lens 12, the controller 900 is controlled to shift the support block 800 according to the heating vision image.

In addition, the reference point P12 of the lens 12 may be the center point of the lens 12, and the reference point P110 of the test chart 110 may be the center point of the test chart 110.

In a determination step (S240), the controller 900 determines whether the optical axis of the camera module 10 is good or bad through the determination image. For example, the determination step (S240) may be performed after the reference alignment step (S230).

Whether the tilting error of the lens 12 is adjusted by means of the control of the controller 900 and the lenses are precisely aligned is checked through the above-mentioned process, so that the optical axis between the lens 12 and the image sensor 14 can be rapidly and precisely aligned.

The adhesive agent curing tilting correction may be performed by a method of aligning optical axes of lenses and assembling a camera module according to another embodiment of the present invention.

Figure 14:
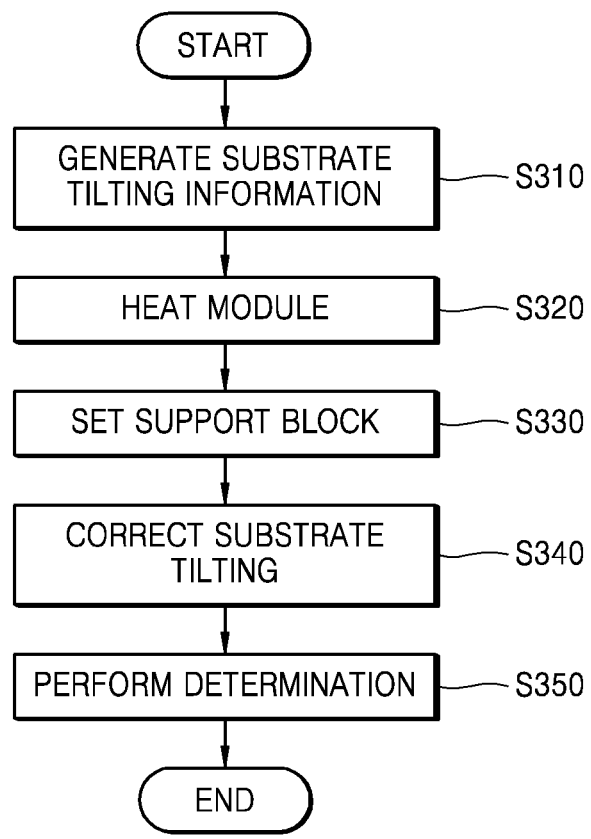
FIG. 14 is a flowchart showing a method of aligning optical axes of lenses and assembling a camera module according to another embodiment of the present invention to perform the adhesive agent curing tilting correction.

Referring to FIG. 14, before heating the camera module 10, a substrate tilting information generating step (S310) is performed by measuring a plurality of points on the substrate 15 using the displacement sensor 200 to generate substrate tilting information. Here, the camera module 10 includes the substrate 15 at which the image sensor 14 is installed, the lens barrel 11 at which the lens 12 is installed, and the lens holder 13 coupled between the substrate 15 and the lens barrel 11. The lens holder 13 is fastened to the substrate 15 such that the active region 14a of the image sensor 14 is exposed through the holder hole 13a, and the lens barrel 11 is coupled to the lens holder 13 through the adhesive agent 2 cured by the heater.

In a module heating step (S320), in order to couple the lens barrel 11 to the lens holder 13 through the adhesive agent 2 cured by the heater, the camera module 10 is heated.

In a support block setting step (S330), the heated camera module 10 is set to the support block 800.

In to substrate tilting correction step (S340), the controller 900 is driven to control the support block 800 according to the substrate tilting information.

In a determination step (S350), the controller 900 determines whether the optical axis of the camera module 10 is good or bad through a determination image. Here, the "determination image" is an image of the test chart 110 detected by the image sensor 14. For example, the determination step (S350) may be performed after the substrate tilting correction step (S340).

Whether the tilting error of the lens 12 is adjusted by means of the control of the controller 900 and the lenses are precisely aligned is checked through the above-mentioned process, so that the optical axis between the lens 12 and the image sensor 14 can be rapidly and precisely aligned.

The invention has been described with reference to an exemplary embodiment illustrated in the drawings, but has been merely exemplified. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for aligning optical axes of lenses and assembling a camera module, the apparatus comprising:
   a support block configured to support a substrate;
   a lens holder configured to be fastened to the substrate by means of three or more bolts;
   a lens barrel attached to the lens holder;
   a lens mounted on the lens barrel;
   an image sensor installed on the substrate and configured to detect an image of a test chart through the lens;
   a lens clamper configured to clamp and move the lens barrel on a surface of the lens holder to match a center point of the lens with a center point of the image sensor according to the image of the test chart;
   a vision camera disposed above the image sensor and configured to detect an image of the image sensor through a holder hole of the lens holder, wherein the support block or the test chart is configured to be shifted to match the center point of the image sensor with a center point of the test chart according to the image of the image sensor;

a displacement sensor configured to detect a tilted state of at least one of the image sensor, the lens barrel, and the substrate to generate tilt information;

a bolt fastener configured to tighten the three or more bolts to fasten the lens holder to the substrate; and a controller configured to control the bolt fastener and an axis of the support block according to the tilt information to correct the tilted state of the image sensor, wherein the bolt fastener is configured to tighten the three or more bolts with different fastening levels to adjust gaps between the lens holder and the substrate.

2. The apparatus for aligning the optical axes of the lenses and assembling the camera module according to claim 1, further comprising a dispenser configured to apply an adhesive agent to one surface of the lens holder to attach the lens barrel on which the lens is mounted to the lens holder.

3. The apparatus for aligning the optical axes of the lenses and assembling the camera module according to claim 2, further comprising a UV radiator configured to radiate an ultraviolet ray to the adhesive agent and cure the adhesive agent.

4. The apparatus for aligning the optical axes of the lenses and assembling the camera module according to claim 2, further comprising an LED illuminator configured to provide uniform illumination to inspect the lens with naked eyes.

5. The apparatus for aligning the optical axes of the lenses and assembling the camera module according to claim 4, wherein the LED illuminator enables determination of whether a surface defect of the lens is present and inspection of the optical axis.

6. The apparatus for aligning the optical axes of the lenses and assembling the camera module according to claim 1, further comprising a collimator lens disposed between the lens and the test chart to reduce a focal distance of the lens.

* * * * *